United States Patent [19]
Houriet, Jr. et al.

[11] Patent Number: 5,743,799
[45] Date of Patent: Apr. 28, 1998

[54] METHOD FOR SETTING GAME CREDITS IN A GAMING MACHINE AND TALLYING A TOTAL CURRENCY AMOUNT FED INTO THE MACHINE

[75] Inventors: John W. Houriet, Jr., Yardley, Pa.; Kevin A. Hassan, Mountainside, N.J.

[73] Assignee: Merit Industries, Inc., Bensalem, Pa.

[21] Appl. No.: 658,289

[22] Filed: Jun. 3, 1996

Related U.S. Application Data

[62] Division of Ser. No. 516,809, Aug. 18, 1995, Pat. No. 5,575,717.

[51] Int. Cl.⁶ .................................................. A63F 9/24
[52] U.S. Cl. ........................................... 463/25; 463/29
[58] Field of Search ............................... 463/25, 27, 29, 463/31, 16; 364/412; 194/217; 273/148 B

[56] References Cited

U.S. PATENT DOCUMENTS

| | | | |
|---|---|---|---|
| 4,335,809 | 6/1982 | Wain | 463/20 |
| 4,467,424 | 8/1984 | Hedges et al. | 463/26 |
| 4,516,777 | 5/1985 | Nikora | 463/46 |
| 4,824,121 | 4/1989 | Beall et al. | 273/376 |
| 4,856,787 | 8/1989 | Itkis | 273/237 |
| 4,922,420 | 5/1990 | Nakagawa et al. | 364/410 |
| 5,042,809 | 8/1991 | Richardson | 463/18 |
| 5,046,736 | 9/1991 | Bridgeman et al. | 463/13 |
| 5,114,157 | 5/1992 | Kita | 463/29 |
| 5,257,179 | 10/1993 | DeMar | 463/25 |
| 5,259,613 | 11/1993 | Marnell, II | 463/42 |
| 5,277,424 | 1/1994 | Wilms | 463/12 |
| 5,342,047 | 8/1994 | Heidel et al. | 463/29 |
| 5,429,361 | 7/1995 | Raven et al. | 463/25 |

Primary Examiner—Jessica Harrison
Assistant Examiner—James Schaaf
Attorney, Agent, or Firm—Panitch Schwarze Jacobs & Nadel, P.C.

[57] ABSTRACT

A system for allowing a game operator to individually tailor parameters of a video game machine provides a plurality of user interactive video screen displays for selecting the parameters. The parameters include the currency value to be associated with different currency types accepted by the machine, and the coin/credit ratio of the machine for each different currency type accepted by the machine.

8 Claims, 4 Drawing Sheets

COIN/CREDIT SETUP

| COIN INPUT | COINS | = | CREDITS | & | METER PULSES |
|---|---|---|---|---|---|
| 1E | 1 | | 1 | | 5 |
| 2E | 1 | | 6 | | 25 |
| 3E | 1 | | 30 | | 100 |
| 4E | 1 | | 1 | | 1 |
| 1M | 1 | | 1 | | 1 |
| 2M | 1 | | 1 | | 1 |

DEFAULT — 82
EXIT — 84

FIG. 4 ant lish# METHOD FOR SETTING GAME CREDITS IN A GAMING MACHINE AND TALLYING A TOTAL CURRENCY AMOUNT FED INTO THE MACHINE This is a division of application Ser. No. 08/516,809, now U.S. Pat. No. 5,575,717, filed Aug. 18, 1995.

FIELD OF THE INVENTION

The present invention relates generally to a system for creating menu choices of video games on a display from a group of video game menu options shown on the video display. The present invention also relates generally to a method for setting game credits in a video game machine and tallying a total currency amount fed into the machine.

BACKGROUND OF THE INVENTION

Devices which allow a user to select menu choices from a video display are well-known in the art. For example, FIG. 5 of U.S. Pat. No. 4,856,787 shows a touch screen display for making a game selection from a menu of games. U.S. Pat. No. 5,342,047 discloses a video lottery terminal with a touch screen user interface. The terminal permits a number of different games to be played on the same machine. The desired game is selected from a menu. One problem with such devices is that a game operator cannot quickly and easily change the menu. Such menus are typically preset in software and thus require advanced programming skills to modify.

Devices which allow a user to select one game from a menu of several games available for play often employ complex hardware and wiring and require insertion of a game cartridge into the device for each game available for selection. See, for example, U.S. Pat. Nos. 4,516,777, 4,922, 420 and 5,114,157. If the game operator wishes to change one of the games available for play (and the menu of games available for play), the operator must physically access a bank of cartridges to change the cartridge in the slot.

Gaming devices which operate upon input of currency (either coin, token or paper money) typically track machine usage in a meter. In one technique, each currency input creates a pulse which sequentially advances the meter. In another technique, each currency input grants a predetermined number of game play credits and the meter is advanced by the granted number of play credits. Neither of these techniques are completely satisfactory for a game operator because the game operator is mainly interested in knowing the total value of currency in the currency receptacle before it is emptied and counted. The first technique does not discriminate between types of currencies and only provides an indication of the total number of currency units (e.g., coins) in the receptacle. The second technique may not give an accurate accounting of the total value of currency because currency inputs do not always exactly correlate with play credits. Some gaming devices are capable of being set to provide bonus credits for additional currency inputs. For example, a gaming machine may be set to grant one game per quarter, but will grant five games per dollar (a bonus credit of one game). However, gaming devices which accept plural currency types (e.g., nickels, quarters, dollars) are relatively inflexible in setting currency/credit ratios. While the ratios for the total currency input may be adjusted, the ratios cannot be individually adjusted for inputs of each currency type.

Despite the existing systems for selecting menu items and modifying game selections, there is still a need for a simple, economical system for creating menus of selectable choices. The present invention fills this need by providing an apparatus and method which creates a video screen of menu choices from a simultaneously displayed group of menu options. In this manner, the game operator can be provided with a single cartridge or software program containing a large number of games, and can employ the menu creation feature to easily and quickly provide a subset of games which are selectable for play on a particular game machine. No cartridge switching or software reprogramming is required to change the game choices.

There is also still a need for controlling a gaming machine meter which advances the meter in accordance with the actual total value of currency entered into the gaming machine and which allows currency inserted/credits given ratios to be flexibly adjustable. The present invention fills these needs by providing an apparatus and method which allows the game operator to program the meter to advance in accordance with the exact value of the entered currency and to allow such ratios to be individually adjusted.

SUMMARY OF THE INVENTION

The present invention is an apparatus for providing menu choices of video games on a video screen having first and second regions. The apparatus comprises a mode selector, a video screen and a display controller. The mode selector sets the apparatus in one of either a programming mode or a menu choice selection mode. The video screen displays video game menu options and video game menu choices. The video game menu options are available for selection as video game menu choices. The display controller causes a simultaneous display of video game menu options and video game menu choices on the video screen when the mode selector is in the programming mode, and causes a display of video game menu choices when the mode selector is in the menu choice selection mode. The display controller also causes video game menu options selected from the second region to be displayed in the first region as a video game menu choice.

Another embodiment of the present invention comprises a method for tallying a total currency amount fed into a gaming machine which accepts a plurality of different types of coins. Each coin type represents a different number of currency units. The method comprises the steps of displaying a setup screen on a video display showing a representation of the plurality of different coin types and the total number of currency units associated with each coin type, selecting the total number of currency units to be associated with each coin type, and tallying the total currency amount fed into the machine based upon the number of coins deposited in the gaming machine and the total number of currency units selected for each coin type.

Another embodiment of the present invention provides a method for adjusting the coin/credit ratio in a gaming machine which accepts a plurality of different types of coins. The method comprises the steps of displaying a setup screen on a video display showing a representation of the plurality of different coin types and a number of game credits associated with a deposit of one coin of a particular type, and selecting the number of game credits to be associated with a deposit of one coin for each of the different coin types.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawing.

DETAILED DESCRIPTION OF PREFERRED EMBODIMENT

Certain terminology is used herein for convenience only and is not be taken as a limitation on the invention. In the drawings, the same reference numerals are employed for designating the same elements throughout the several figures.

Figure 1:
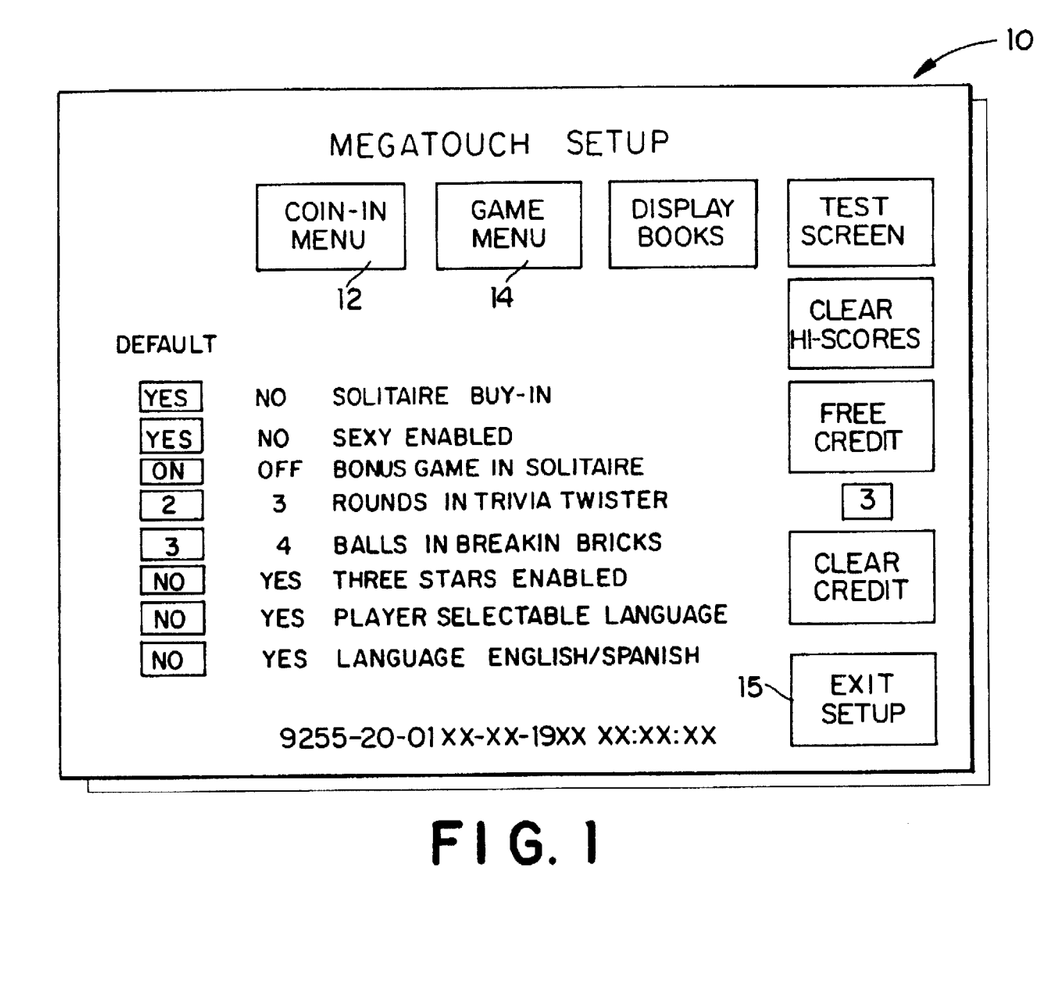
FIG. 1 is a main screen display of a game apparatus for accessing screens which create game menus and coin/credit setups.
Figure 2:
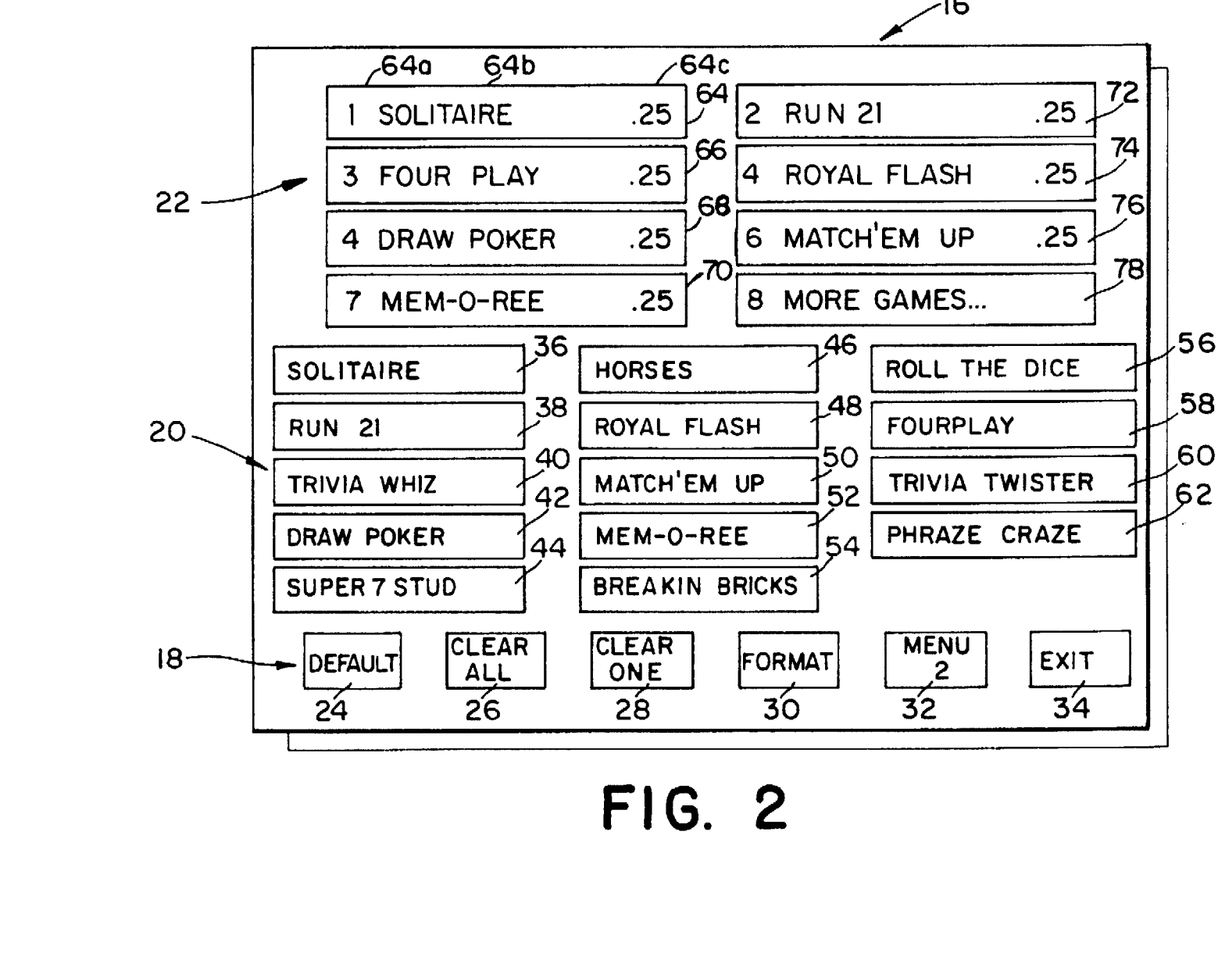
FIG. 2 is a screen display for creating a game menu.
Figure 3:
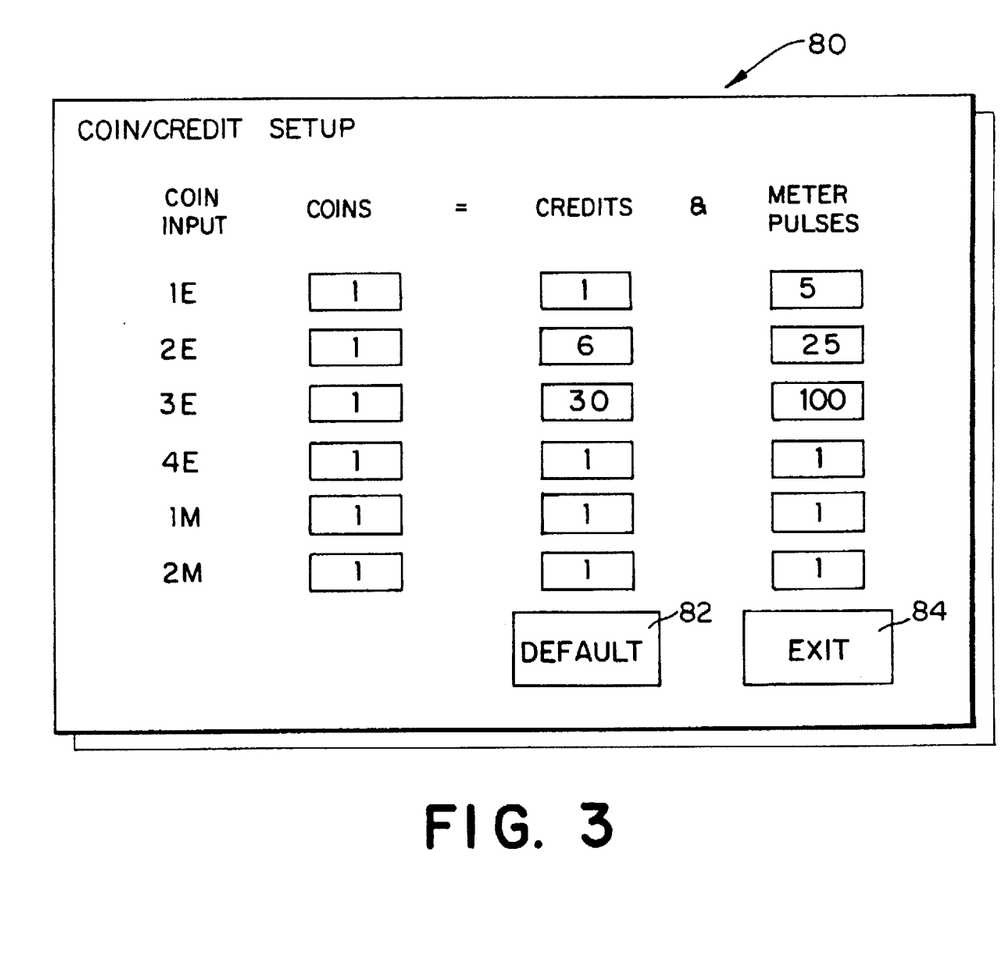
FIG. 3 is a screen display for creating a coin/credit setup.

FIGS. 1-3 show screen displays for implementing the functions of the invention in a game apparatus. In the preferred embodiment of the invention, the video display is a touch screen. As is well-known in the art, indicators or images of buttons on a touch screen designate locations which, if touched, activate the function described within the location. Touch screen buttons may be replaced with hard-wired keyboard buttons which correspond to the screen locations. The scope of the invention includes touch screen buttons and their equivalent keyboard buttons. Since touch screens are well-known in the art, general details of the touch screen are not further provided herein.

FIG. 1 shows a main screen display 10 for a game apparatus having a touch screen display. The main screen display 10 is not available to the game players. The game operator accesses the main screen display 10 by pressing an operator button on the game apparatus, inserting an operator key, entering a password, or the like. The main screen display 10 allows the operator to set or reset a plurality of game parameters, or to select a coin-in menu screen through indicator or button 12 or a game menu screen through indicator or button 14. To exit the main screen display 10, Exit Setup button 15 is touched. Thereupon, the game apparatus either enters a menu choice selection mode (described in more detail below) or an attract mode from which the menu choice selection mode can be entered.

FIG. 2 shows a game menu screen display 16 which appears upon touching button 14 in FIG. 1. The display 16 is divided into first, second and third regions 18, 20 and 22, respectively. The first region 18 is positioned along the bottom of the display 16 and provides a plurality of function buttons including a Default button 24, Clear All button 26, Clear One button 28, Format button 30, Menu 2 button 32, and Exit button 34. The function of the buttons 24-34 are described below. The second region 20 is positioned in a middle area of the display 16 and provides a plurality of selectable menu options. In one embodiment of the invention, the menu options are video games. In the embodiment depicted in FIG. 2, fourteen video games are displayed in the second region 20. Each video game may be selected as a menu option by touching the appropriate button 36-62. The third region 22 is positioned in a top area of the display 16 and provides a plurality of numbered locations for menu choices. In the embodiment depicted in FIG. 2, eight menu choice positions or locations 64-78 are displayed in the third region 22. Each location 64-78 has a first area for indicating the location number, a second area for indicating the menu choice and a third area for indicating the activation cost of the menu choice. The three areas are designated as a-c, respectively. For example, location 64 includes areas 64a, 64b and 64c. The menu choices placed in the menu choice locations 64-78 are selected from the menu options 36-62.

The game apparatus has two modes of operation relevant to the game menu screen display 16, a programming mode and a menu choice selection mode. In the programming mode, menu options 36-62 are selected by the operator from the second region 20 and placed in locations 64-78 in the third region 22 as designated by the operator. If the screen display 16 is a touch screen, the game operator touches an area a of a location 64-78 (e.g., 64a) and then touches a menu option 36-62 in the second region 20. If the screen display 16 is a conventional video display, the game operator selects a location 64-78 by number and then selects a menu option 36-62 in the second region 20 by number or by cycling through the options 36-62 via a keyboard.

In one embodiment of the programming mode, as shown in FIG. 2, all of the menu options 36-62 remain on the second region 20 of the display 16, even after a selected menu option is placed in a designated location 64-78. In another embodiment of the programming mode (not shown), a selected menu option is deleted from the second region of the display 16 when it is placed in the designated location 64-68. The first embodiment allows a single menu option to be placed in more than one location 64-78, if desired.

In the menu choice selection mode, the programmed menu choices are selectable for game activation, either by touching the location of the desired game (if the screen display 16 is a touch screen), or by pressing the appropriate game number on a keyboard (if the screen display 16 is a conventional video display). In the preferred embodiment of the menu choice selection mode, the menu options 36-62 do not appear on the display 16. Also, blank (i.e., unselected) locations 64-78 do not appear. More specifically, when the menu programming is completed, the Format button 30 is touched to delete blank locations 64-78, if any, from the screen display 16. Then, the Exit button 34 is touched either once or twice (depending upon the stage of programming) to return the game apparatus to the main screen display 10. Upon exiting the main screen display 10, the game apparatus is placed in the menu choice selection mode. Thereupon, the menu options 36-62 disappear from the screen 16 and the menu choices become activatable.

During the programming mode, the Default button 24 places factory preset menu options 36-62 in predesignated menu choice locations 64-78. The Clear All button 26 deletes all previously selected menu choices from the locations 64-78. The Clear One button 28 deletes a selected menu choice from a selected location 64-78, the location being selected by touch or keyboard designation. The Menu 2 button 32 causes a second screen 16' (not shown) to be displayed which allows additional locations to be programmed. If more than eight games are programmed as menu choices, the eighth location 78 on the first screen 16 is touched in the menu selection mode to display the second screen 16' containing the additional menu choices.

During the programming mode, it is also possible to adjust the activation cost of a menu choice (e.g., the cost of playing one round of a video game). After a location 64-78 and menu option 36-62 is selected, a factory preset default activation cost of one credit appears in area c of the selected location (e.g., 64c). In the screen display 16 shown in FIG.

2, the factory preset default is 25 cents/credit. Successively touching the area c increments the activation cost by one credit (e.g., 50 cents, 75 cents, $1.00). After four credits are reached, the activation cost cycles back to one credit. When the desired activation cost is reached, the Exit button 34 is touched once. The next menu choice may now be programmed. If the Exit button 34 is touched again, the programming mode is exited and the game apparatus returns to the main screen display 10 of FIG. 1.

The game menu selection feature of FIG. 2 dramatically improves the versatility of game apparatus which allow plural video games to be played on one apparatus. The game operator is provided with a single cartridge or software program containing a large number of games. The game operator installs the cartridge or program, enters the screen 16 and selects a desired subset of games which are selectable for play on the apparatus.

Subsequently, the game operator may quickly change the subset of video games selectable for play without replacing or modifying the cartridge or software program.

FIG. 3 shows a coin/credit setup screen display 80 which appears upon touching button 12 in FIG. 1. The word "coin" is employed above and hereafter interchangeably with the word "currency" to designate any form of coin, token or paper money currency. Although game apparatus such as video game terminals primarily accept coin-type currency, the scope of the invention includes all three forms of currency and their equivalents.

The coin/credit setup screen display 80 allows a game operator to adjust the coin/credit ratio for each coin type. The display 80 also allows the game operator to set meter pulses in accordance with the total coin value associated with each coin. To perform these functions, the display includes a grid of columns and rows of adjustable values. To fully understand FIG. 3, the contents of the rows and columns are described. Default values are set to "1".

The first column in display 80 shows a designation for a coin type. The first column is set at the factory and cannot be changed by the game operator. Each country has one or more currency units, and different types of coins or paper money which are equal to discrete amounts of currency units. For example, one currency unit in the United States is "cents." The United States Mint makes pennies equal to one currency unit, nickels equal to five currency units, dimes equal to ten currency units, quarters equal to twenty-five currency units, dollar coins or dollar bills equal to one hundred currency units, and so on. Likewise, a currency unit in Mexico is the peso and there are different types of coins which represent discrete numbers of pesos. The display 80 shows four electronic mech or mechanism inputs (1E, 2E, 3E and 4E) and two mechanical mech inputs (1M and 2M). 1E–4E and 1M–2M are representations of different currency units assigned by the game operator. The electronic mech inputs may be used when the game apparatus accepts more than one type of coin representing currency units. For example, 1E may represent a nickel, 2E may represent a quarter, and 3E may represent a dollar bill or coin. The mechanical mech inputs may be employed, for example, if tokens are used instead of coins.

The second column in the display 80 shows an operator selectable number representing a number of coins for each different currency type which will equal a given number of credits and meter pulses. For simplicity of understanding of the invention, the example shown in FIG. 3 uses the default value of "1". Thus, the coin/credit ratio will be 1/n, where n is the number of credits. However, the second column may be set to a discrete number such as "2", "3", and so on, as described in more detail below.

The third column in the display 80 shows the number of game credits granted for each input of the selected number of coins. The game operator also sets the numbers in the third column. The example shown in FIG. 3 is set to provide one credit per 5 currency units, assuming that 1E represents a nickel, 2E represents a quarter, and 3E represents a dollar bill or coin. Thus, one nickel provides one credit. To encourage more play, extra credits may be given for a quarter or dollar bill or coin. Instead of granting five credits for a quarter (25 units), six credits may be given. Instead of granting twenty credits for a dollar bill or coin (100 units), thirty credits may be granted.

As noted above, the number of coins in the second column and the number of credits granted in the third column are individually adjustable. In the example of FIG. 3, the coin/credit ratio will be 1/n, where n is the number of credits. However, the second column may be set to a discrete number such as "2". In another example, for a given coin input, the number of currency units can be set to "5" and the number of credits set to "2". Thus, five currency units (e.g., five nickels) would be required to achieve two credits, a 5/2 ratio. Different numbers and credits may be selected for each of the coin inputs 1E–4E and 1M–2M.

The fourth column in the display 80 shows the number of meter pulses for each for each input of the selected number of coins. The game operator also sets the numbers in the third column. The example shown in FIG. 3 shows that a 1E coin input (a nickel, in the example) provides five meter pulses, a 2E coin input (a quarter, in the example) provides twenty-five meter pulses and a 3E coin input (a dollar bill or coin, in the example) provides one hundred meter pulses. Thus, the meter pulse is equal to the number of currency units deposited in the game device (i.e., the total currency amount deposited in the game device). If the game operator checks the meter midday, and it registers 1,250, there would be $12.50 in the currency receptacle if the system was set for U.S. currency units.

The versatility of the coin/credit setup should now be apparent. The ratio of coins inserted to game credits granted per coin can be individually adjusted for each coin type. Furthermore, the ratio of coins inserted to game credits granted per coin can be adjusted independent of the meter pulse values so that the actual coin values can be tallied independent of the game credit values. The coin/credit setup may be individually programmed for the currency units available in each country, thereby allowing the game apparatus to be adaptable to the currency in any part of the world by simple operator programming steps.

If the display 80 is a touch screen, the settings are programmed by touching the appropriate location in the second, third or fourth column, and incrementing the number by one for each screen touch. If the display 80 is a conventional video display, the game operator selects a row and column, and location value by appropriate keyboard manipulation. If factory preset default values are desired, Default button 82 is touched or selected. When programming is completed, Exit button 84 is touched or selected to return the game apparatus to the main screen display 10.

Figure 4:
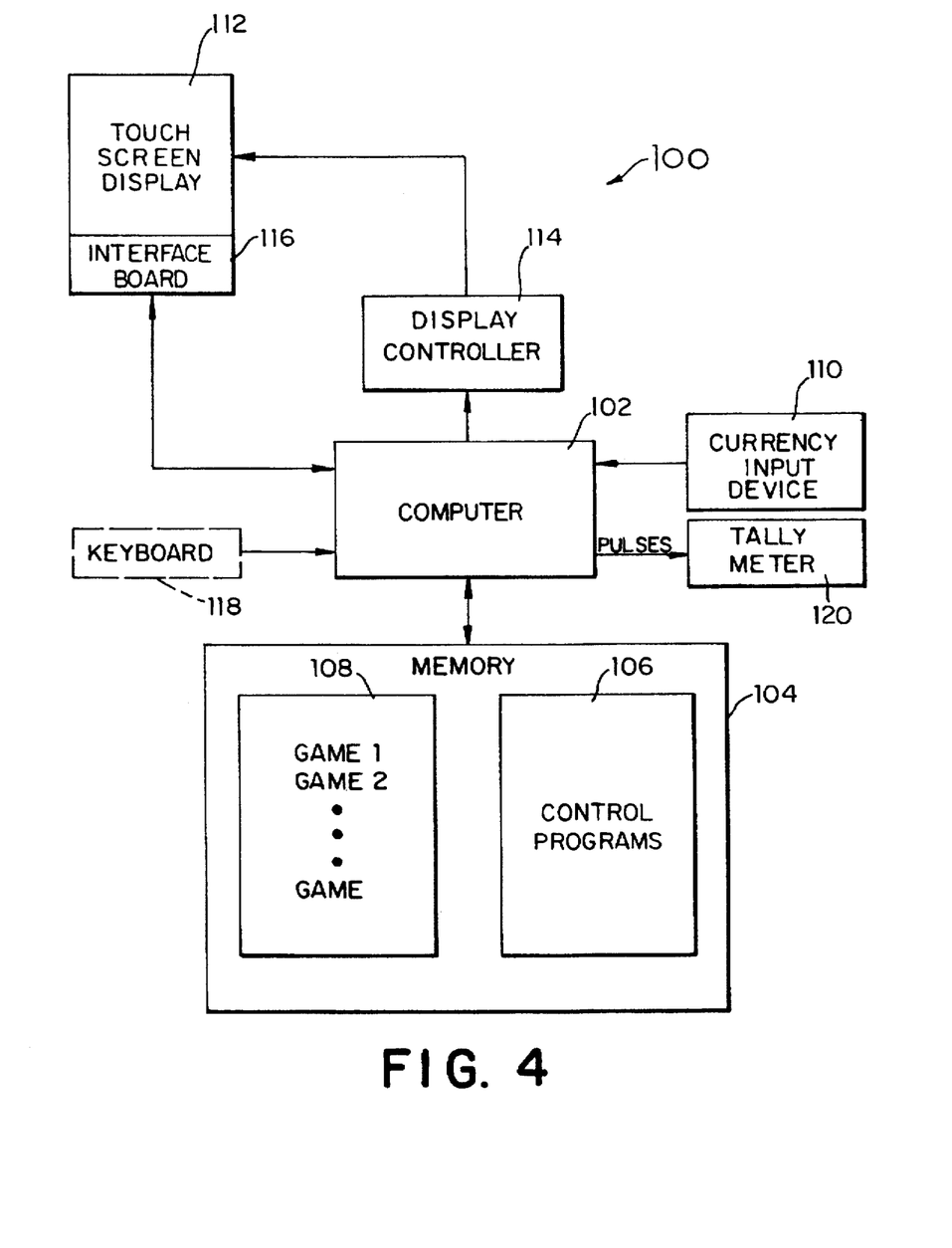
FIG. 4 is a schematic block diagram of apparatus for creating the screen displays in FIGS. 1-3.

FIG. 4 shows a schematic block diagram of a preferred embodiment of the game apparatus 100. A computer 102, such as a microprocessor, controls the operation of the game apparatus 100. The computer 102 is bidirectionally connected with memory 104 which contains apparatus control programs 106 and game programs 108. The game programs 108 are accessed by the computer 102 only when menu choices are selected during the menu choice selection mode. The control programs 106 perform all of the remaining tasks of the game apparatus 100, including generating the screens 10, 16 and 80, selecting the mode of operation, and storing parameters designated by the screens. A currency input device 110 is also connected to the computer 102 for receiving currency for operating the game apparatus 100. Touch screen display 112 is connected to the computer 102 through display controller 114. The touch screen display 112 is also bidirectionally connected with the computer 102 through interface board 116. The interface board 116 reads the inputs from the touch screen display 112. If the touch screen display 112 is replaced by a conventional video display, keyboard 118 connected to the computer 102 provides the inputs which would have been provided by the touch screen display 112. The game apparatus further includes a tally meter 120 for receiving pulses from the computer 102 in accordance with signals received from the currency input device 110 and the setup parameters from the screen 80 in FIG. 3.

Programming touch screen displays and programming touch screen locations to correlate with programmed selections are well-known in the art and, thus, are not described in detail herein.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method for tallying a total currency amount fed into a gaming machine which accepts a plurality of different types of coins, each coin type representing a different number of currency units, the method comprising the steps of:
    (a) displaying a setup screen on a video display showing a representation of the plurality of different coin types and the total number of currency units associated with each coin type;
    (b) selecting the total number of currency units to be associated with each coin type while displaying the setup screen, wherein the selection is made individually for each coin type, a coin type/currency unit ratio being established for each different type of coin; and
    (c) tallying the total currency amount fed into the machine based upon the number of coins deposited in the gaming machine and the total number of currency units selected for each coin type.

2. A method according to claim 1 wherein the total number of currency units to be associated with each coin type is represented by a discrete number and step (c) is performed by the step of advancing a tally total meter by the discrete number each time a particular coin type is entered prior to game play.

3. A method for setting game credits and tallying a total currency amount fed into a gaming machine which accepts a plurality of different types of coins, each coin type representing a different number of currency units; the method comprising the steps of:
    (a) displaying a setup screen on a video display showing a representation of the plurality of different coin types, the number of game credits associated with each coin type and the total number of currency units associated with each coin type;
    (b) selecting the number of game credits to be associated with each coin type while displaying the setup screen, wherein the selection is made individually for each coin type, a coin type/game credit ratio being established for each of the different coin types;
    (c) selecting the total number of currency units to be associated with each coin type while displaying the setup screen, wherein the selection is made individually for each coin type;
    (d) exiting the setup screen and entering game play mode;
    (e) granting game credits based upon the number and type of coins deposited into the machine and the selection made in step (b); and
    (f) tallying the total currency amount fed into the machine based upon the number of coins deposited in the gaming machine and the total number of currency units selected for each coin type in step (c).

4. A method according to claim 3 wherein the total number of currency units to be associated with each coin type is represented by a discrete number and step (f) is performed by the step of advancing a tally total meter by the discrete number each time a particular coin type is entered prior to game play.

5. A method for setting game credits and tallying a total currency amount fed into a gaming machine, the gaming machine accepting a plurality of different types of coins, each coin type representing a different number of currency units, the method comprising the steps of:
    (a) displaying a setup screen on a video display showing
        (i) a representation of the plurality of different coin types,
        (ii) a number of coins for each different coin type,
        (iii) a number of game credits associated with the number of coins for each different coin type, and
        (iv) a total number of currency units associated with the number of coins for each different coin type;
    (b) selecting the number of coins for each different coin type, the number of game credits to be associated with the selected number of coins for each different coin type, and the total number of currency units to be associated with the selected number of coins for each different coin type, all of the selections being made while displaying the setup screen, wherein each of the selections are made individually for each coin type, a coin type/game credit ratio being established for each of the different coin types;
    (c) exiting the setup screen and entering a game play mode;
    (d) granting game credits based upon the number and type of coins deposited into the machine and the selections made in step (b); and
    (e) tallying the total currency amount fed into the gaming machine based upon the number and type of coins deposited in the gaming machine and the total number of currency units selected for each number of coins in step (b).

6. A method according to claim 5 wherein the total number of currency units to be associated with each coin type is represented by a discrete number and step (e) is performed by the step of advancing a tally total meter by the discrete number each time a particular coin type is entered prior to game play.

7. A method for adjusting the coin/credit ratio in a gaming machine which accepts a plurality of different types of coins, the method comprising the steps of:

(a) displaying a setup screen on a video display showing a representation of the plurality of different coin types and a number of game credits associated with a deposit of one coin of a particular type; and (b) selecting the number of game credits to be associated with a deposit of one coin for each of the different coin types while displaying the setup screen, wherein the selection is made individually for each coin type, a coin type/game credit ratio being established for each of the different coin types.

8. A method for adjusting the coin/credit ratio in a gaming machine which accepts a plurality of different coin types, the method comprising the steps of:

(a) displaying a setup screen on a video display showing
  (i) a representation of the plurality of different coin types,
  (ii) a number of coins for each different coin type, and
  (iii) a number of game credits associated with the number of coins for each different coin type; and (b) selecting the number of coins for each different coin type and the number of game credits to be associated with the selected number of coins for each of the different coin types while displaying the setup screen, wherein the selections are made individually for each coin type, a coin type/game credit ratio being established for each of the different coin types.

* * * * *

(12) EX PARTE REEXAMINATION CERTIFICATE (5376th)
United States Patent
Houriet, Jr. et al.

(10) Number: US 5,743,799 C1
(45) Certificate Issued: May 23, 2006

(54) METHOD FOR SETTING GAME CREDITS IN A GAMING MACHINE AND TALLYING A TOTAL CURRENCY AMOUNT FED INTO THE MACHINE

(75) Inventors: John W. Houriet, Jr., Yardley, PA (US); Kevin A. Hassan, Mountainside, NJ (US)

(73) Assignee: Madison Capital Funding LLC, Chicago, IL (US)

Reexamination Request:
No. 90/007,033, May 7, 2004

Reexamination Certificate for:
Patent No.: 5,743,799
Issued: Apr. 28, 1998
Appl. No.: 08/658,289
Filed: Jun. 3, 1996

Related U.S. Application Data

(62) Division of application No. 08/516,809, filed on Aug. 18, 1995, now Pat. No. 5,575,717.

(51) Int. Cl.
*A63F 9/24* (2006.01)

(52) U.S. Cl. .......................................... 463/25; 463/29

(58) Field of Classification Search .............. 463/25–29; 194/217
See application file for complete search history.

(56) References Cited

U.S. PATENT DOCUMENTS 5,154,272 A * 10/1992 Nishiumi et al. ........... 194/318

FOREIGN PATENT DOCUMENTS

JP                05-089325        * 4/1993

OTHER PUBLICATIONS

U.S. Games, Pot–O–Gold Operational/Technical Manual, 1993–1994 (pages have been numbered JVL 000936–001112).
Midway, Mortal Kombat II, Oct., 1993.

* cited by examiner

*Primary Examiner*—Michael O'Neill (57) ABSTRACT

A system for allowing a game operator to individually tailor parameters of a video game machine provides a plurality of user interactive video screen displays for selecting the parameters. The parameters include the currency value to be associated with different currency types accepted by the machine, and the coin/credit ratio of the machine for each different currency type accepted by the machine.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–7 and 8 is confirmed.

* * * * *

(12) EX PARTE REEXAMINATION CERTIFICATE (5784th)
United States Patent
Houriet, Jr. et al.

(10) Number: US 5,743,799 C2
(45) Certificate Issued: Jun. 12, 2007

(54) METHOD FOR SETTING GAME CREDITS IN A GAMING MACHINE AND TALLYING A TOTAL CURRENCY AMOUNT FED INTO THE MACHINE

(75) Inventors: John W. Houriet, Jr., Yardley, PA (US); Kevin A. Hassan, Mountainside, NJ (US)

(73) Assignee: Madison Capital Funding LLC., Chicago, IL (US)

Reexamination Request:
No. 90/008,059, Jun. 26, 2006

Reexamination Certificate for:
Patent No.: 5,743,799
Issued: Apr. 28, 1998
Appl. No.: 08/658,289
Filed: Jun. 3, 1996

Reexamination Certificate B1 5,743,799 issued May 23, 2006

Related U.S. Application Data

(62) Division of application No. 08/516,809, filed on Aug. 18, 1995, now Pat. No. 5,575,717.

(51) Int. Cl.
*A63F 13/10* (2006.01)
*G07F 17/32* (2006.01)

(52) U.S. Cl. .......................... 463/25; 463/29
(58) Field of Classification Search .................. None
See application file for complete search history.

(56) References Cited

U.S. PATENT DOCUMENTS

| | | | |
|---|---|---|---|
| 4,335,809 A | 6/1982 | Wain | 463/20 |
| 4,467,424 A | 8/1984 | Hedges et al. | 463/26 |
| 4,516,777 A | 5/1985 | Nikora | 463/46 |
| 4,824,121 A | 4/1989 | Beall et al. | 273/376 |
| 4,856,787 A | 8/1989 | Itkis | 273/237 |
| 4,922,420 A | 5/1990 | Nakagawa et al. | 364/410 |
| 4,926,368 A | 5/1990 | Morita et al. | |
| 5,042,809 A | 8/1991 | Richardson | 463/18 |
| 5,046,736 A | 9/1991 | Bridgeman et al. | 463/13 |
| 5,114,157 A | 5/1992 | Kita | 463/29 |
| 5,257,179 A | 10/1993 | DeMar | 463/25 |
| 5,259,613 A | 11/1993 | Marnell, II | 463/42 |
| 5,277,424 A | 1/1994 | Wilms | 463/12 |
| 5,342,047 A | 8/1994 | Heidel et al. | 463/29 |
| 5,429,361 A | 7/1995 | Raven et al. | 463/25 |
| 5,573,457 A | 11/1996 | Watts et al. | |

OTHER PUBLICATIONS

U.S. Games, Pot–O–Gold Operational/Technical Manual, 1993–1994 (pages have been numbered JVL 000936–001112).
Midway, Mortal Kombat II, Oct. 1993.

*Primary Examiner*—Michael O'Neill (57) ABSTRACT

A system for allowing a game operator to individually tailor parameters of a video game machine provides a plurality of user interactive video screen displays for selecting the parameters. The parameters include the currency value to be associated with different currency types accepted by the machine, and the coin/credit ratio of the machine for each different currency type accepted by the machine.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-8 is confirmed.

* * * * *